United States Patent Office 3,441,633
Patented Apr. 29, 1969

3,441,633
CYCLIC PHOSPHITES
Lester Friedman, Beachwood, Ohio, assignor to Weston
Chemical Corporation, Newark, N.J., a corporation of
New Jersey
No Drawing. Filed Dec. 3, 1965, Ser. No. 511,335
Int. Cl. C07d 105/04; C08f 45/58
U.S. Cl. 260—927                               17 Claims

ABSTRACT OF THE DISCLOSURE

Compounds are prepared having a formula selected from the group consisting of (a) 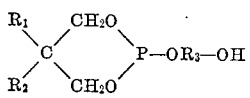

and (b) 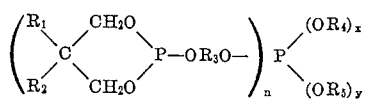

where $R_1$ and $R_2$ are lower alkyl, —$OR_3O$— is the divalent residue of a member of the group consisting of (1) dihydric alcohols having at least 4 carbon atoms separating the hydroxyl groups, any substituents on the dihydric alcohol other than hydrogen being ether oxygen, said dihydric alcohol having a molecular weight up to 2025, and (2) dihydric phenols having at least 4 carbon atoms separating the phenolic groups, said dihydric phenol having the formula

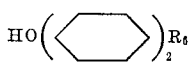

where $R_6$ is selected from the group consisting of lower alkylidene, S, SO, $SO_2$ and the chloro and bromo derivatives thereof wherein the chlorine or bromine is attached to the phenyl groups when $R_6$ is alkylidene, $R_4$ and $R_5$ are selected from the group consisting of 1 to 18 carbon atom alkyl, phenyl, methylphenyl and chlorophenyl, $n$ is an integer from 1 to 3, and $x+y$ equals $3-n$. The compounds are useful as stabilizers for halogen-containing polymers and polymeric hydrocarbons.

---

The present invention relates to the preparation of novel phosphites.

It is an object of the present invention to prepare novel phosphites which are not readily hydrolyzed.

Another object is to stabilize vinyl chloride resins.

A further object is to stabilize monoolefin polymers.

An additional object is to stabilize natural and synthetic rubbers.

Yet another object is to develop stabilizers and fire and/or flame retardants for polyurethanes and polyesters.

Yet another object is to prepare phosphite of relatively low volatility.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing phosphites having the following formula

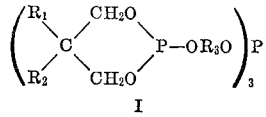
I when $R_1$ and $R_2$ are alkyl, preferably lower alkyl, e.g., methyl, ethyl and propyl and $R_3$ is the residue of a polyalkylene glycol having at least four carbons separating the hydroxyl groups, or a bisphenol such as di (4-hydroxyphenyl) dimethyl methane (bisphenol A) or tetrachloro bisphenol A, or 4,4'-isopropylidene dicyclohexanol (hydrogenated bisphenol A).

The compounds of the invention as indicated above are useful as stabilizers for vinyl chloride resins, e.g., in an amount of 0.1–10 parts per 100 parts of polyvinyl chloride. They are also useful as stabilizers for polyethylene, polypropylene, ethylene-propylene copolymers, ethylene-propylene-nonconjugated polyene terpolymers, polybutylene, natural rubber, rubbery butadiene-styrene copolymer and butadiene-acrylonitrile copolymer. From 0.1 to 10 parts of stabilizer are employed per 100 parts of polymer.

They can also be used in an amount of 0.1 to 30 parts to 100 parts of polyurethane, e.g. the polyurethane from toluene diisocyanate and glycerine-propylene oxide adduct molecular weight 3000, or with a polyester, e.g., styrene-modified ethylene glycol-proplyene glycol adipate-maleate. In the lower end of the range of proportions they act substantially solely as stabilizers for the polyurethane or polyester. In the upper range they also act as fire and flame retardant agents. They also increase the fire and flame retardant properties of the hydrocarbon polymers such as polyethylene, polypropylene and the rubbers.

Unless otherwise indicated all parts and percentages are by weight.

The compounds of Formula I can be prepared by several methods.

Thus there can be used a two step reaction as follows (a)
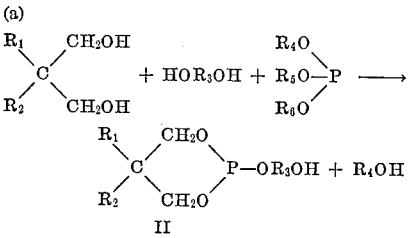

where $R_4$, $R_5$ and $R_6$ are alkyl, aryl or haloaryl (b)
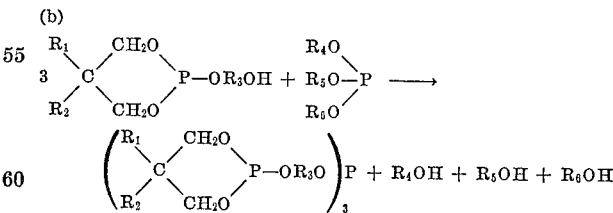

Alternatively, a one step reaction can be employed as follows

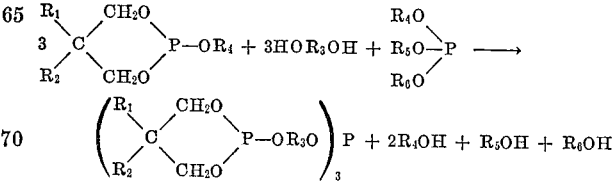

Many of the compounds of Formula II also are new compounds. In addition to being useful in making the compounds of Formula I they are useful in their own right as stabilizers for polyvinyl chloride resins, polyethylene polypropylene, polyurethans, polyesters, natural and synthetic rubbers. Because of their hydroxyl group they can take part as chain stoppers in forming polyurethanes and polyesters. While the presence of the hydroxyl group is often desirable in some instances it is objectionable. This is one of the reasons why the compounds of Formula I are the preferred stabilizers according to the invention.

Whether a one stage or two stage reaction is employed there is normally used a dihydrocarbyl or dihaloaryl phosphite or an alkaline catalyst in an amount of 0.05–5% by weight of the phosphite reactant.

Examples of suitable catalysts are dialkyl or diaryl or dihaloaryl phosphites such as diphenyl phosphite, di-o-cresyl phosphite, di-p-cresyl phosphite, didecyl phosphite, diisodecyl phosphite, dioctadecyl phosphite, dimethyl phosphite, diethyl phosphite, di-o-chlorophenyl phosphite, di-2,4-dichlorophenyl phosphite or alkaline catalysts such as sodium phenolate, sodium methylate, sodium cresylate, potassium phenolate, sodium isodecylate. The alkaline catalysts preferably have a pH of at least 11 in an 0.1 N solution.

The phosphites of Formulae I and II are remarkably stable toward hydrolysis, heat and light.

Examples of starting compounds having the formula $$\begin{array}{c} R_4O \\ R_5O-P \\ R_6O \end{array}$$

are trimethyl phosphite, triethyl phosphite, tripropyl phosphite, triamyl phosphite, tris octyl phosphite, tris isodecyl hosphite, tris dodecyl phosphite, tris octadecyl phosphite or other trialkyl phosphites, triphenyl phosphite, tri-o-cresyl phosphite, tri-p-cresyl phosphite, tri-m-cresyl phosphite, tri-xylenyl phosphite or other triaryl phosphites, phenyl diisodecyl phosphite, diphenyl p-chlorophenyl phosphite, tri-p-chlorophenyl phosphite, tri-o-chlorophenyl phosphite.

As the compound having the formula $HOR_3OH$ there is preferably used dipropylene glycol. However, there can also be used tripropylene glycol, tetrapropylene glycol, diethylene glycol, triethylene glycol, tetramethylene glycol, ditetramethylene glycol, bisphenol A and other di (hydroxyaryl) alkylidenes such as di (4-hydroxy-3-methylphenyl) diphenyl methane, di (4-hydroxyphenyl) methane, di(4-hydroxyphenyl) ethane, di(4-hydroxyphenyl) methyl ethyl methane, di(4-hydroxyphenyl) sulfone, di (4-hydroxyphenyl) sulfide, di (4-hydroxyphenyl) sulfoxide, tetrachloro bisphenol A, tetrabromo bisphenol A and hydrogenated bisphenols such as 4,4'-isopropylidene dicyclohexanol (hydrogenated bisphenol A).

It will be observed that any substituents other than hydrogen in the dihydric alcohol are ether oxygen atoms. The dihydric alcohol can have a molecular weight up to 2025.

Dihydric phenol used to form the —$OR_3O$— grouping, it will be observed, has the formula $$HO\!-\!\!\left(\!\!\bigcirc\!\!\right)\!-\!R_{6_2}$$

where $R_6$ is selected from the grouping consisting of lower alkylidene, S, SO, $SO_2$ and when $R_6$ is alkylidene the phenol groups can contain chlorine or bromine.

Examples of suitable neoalkylene glycols useful as starting materials in the two step reaction are neopentylene glycol (2,2-dimethyl-1,3-propanediol), neohexylene glycol (2-ethyl-2-methyl-1,3-propanediol, 2,2-diethyl-1,3-propanediol (neoheptylene glycol), 2,2-dipropyl-1,3-propanediol (neononylene glycol).

Examples of suitable starting heterocyclic phosphites in the one step reaction are neopentylene phenyl phosphite, neohexylene phenyl phosphite, neopentylene p-cresyl phosphite, neopentylene isodecyl phosphite, neohexylene decyl phosphite.

If at least 1 but less than three moles of heterocyclic phosphite are used in the second stage of the two stage reaction per mole of $$\begin{array}{c} R_4O \\ R_5O-P \\ R_6O \end{array}$$

or if a similar mole ratio adjust is made in the one stage reaction there are obtained phosphites as products still having $R_4$ or $R_5$ substituents. Such materials also are within the invention and have the same uses as the phosphites of Formula I. However, the phosphites of Formula I are preferred. The generic formula to cover the phosphites of Formula I and the phosphites still having an $R_4$ or $R_5$ group is as follows $$\left(\begin{array}{c} R_1 \\ \phantom{R}C \\ R_2 \end{array}\!\!\begin{array}{c} CH_2O \\ \phantom{R} \\ CH_2O \end{array}\!\!P-OR_3O\right)_n P\begin{array}{c}(OR_4)_x \\ (OR_5)_y\end{array}$$

where $n$ is an integer from 1 to 3 and $x+y$ equal $3-n$.

Examples of compounds within the present invention and within Formula III are tris (neopentylene) tris (dipropylene glycol) tetraphosphite,
neopentylene dipropylene glycol diphenyl diphosphite,
neopentylene dipropylene glycol diisodecyl diphosphite,
bis (neopentylene) bis (dipropylene glycol) phenyl triphosphite,
bis (neohexylene) bis (diethylene glycol) octyl triphosphite,
bis (neopentylene) bis (hydrogenated bisphenol A) p-cresyl triphosphite,
tris (neohexylene) tris (dipropylene glycol) tetraphosphite,
tris (neoheptylene) tris (dipropylene glycol) tetraphosphite,
tris (neononylene) tris (dipropylene glycol) tetraphosphite,
tris (neohexylene) tris (diethylene glycol) tetraphosphite,
tris (neopentylene) tris (diethylene glycol) tetraphosphite,
tris (neopentylene) tris (tripropylene glycol) tetraphosphite,
tris (neohexylene) tris (tetramethylene glycol) tetraphosphite,
tris (neopentylene) tris (polypropylene glycol molecular weight 2025) tetraphosphite,
tris (neopentylene) tris (bisphenol A) tetraphosphite,
tris (neopentylene) tris (hydrogenated bisphenol A) tetraphosphite,
tris (neohexylene) tris (hydrogenated bisphenol A) tetraphosphite,
tris (neopentylene) tris (tetrachloro bisphenol A) tetraphosphite,
tris (neohexylene) tris (tetrabromo bisphenol A) tetraphosphite,
tris (neopentylene) tris (di-(4-hydroxyphenyl) methane) tetraphosphite,
tris (neopentylene) tris (di-(4-hydroxyphenyl) ethane) tetraphosphite,
tris (neopentylene) tris (di-(4-hydroxyphenyl) sulfone) tetraphosphite.

Examples of compounds within Formula II are dipropylene glycol (neopentylene) phosphite (2-hydroxypropoxypropoxy-5,5-dimethyl - 1,3,2 - dioxaphosphorinane),
dipropylene glycol (neohexylene) phosphite, diethylene glycol (neopentylene) phosphite,
(diethylene glycol (neohexylene) phosphite,
dipropylene glycol (neoheptylene) phosphite,
tetramethylene glycol (neohexylene) phosphite, polypropylene glycol molecular weight 2025 (neopentylene) phosphite,
bisphenol A (neopentylene) phosphite,
hydrogenated bisphenol A (neopentylene) phosphite,
hydrogenated bisphenol A (neohexylene) phosphite,
tetrachlorobisphenol A (neopentylene) phosphite,
tetrabromobisphenol A (neohexylene) phosphite,
di (4-hydroxyphenyl) methane (neopentylene) phosphite,
di (4-hydroxyphenyl) ethane (neopentylene) phosphite,
di (4-hydroxyphenyl)sulfone (neopentylene) phosphite.

Unless otherwise indicated all parts and percentages are by weight.

EXAMPLE 1

Into a 3 liter flask equipped with a distillation column, water condenser and receiver there were added 1550 grams (5 moles) of triphenyl phosphite, 520 grams (5 moles) of neophentylene glycol, 670 grams (5 moles) of dipropylene glycol and 10 grams of diphenyl phosphite. The mixture was heated at a pot temperature which gradually increased from 136 to 152° C. over a 5 hour period. The phenol was removed by distillation under vacuum (10–15 mm.). In all 1266 grams of phenol were removed together with about 110 grams of glycol. The product in the pot was dipropylene glycol (neopentylene) phosphite and had a refractive index of 1.4765.

To 798 grams (3 moles) of the dipropylene glycol (neopentylene) phosphite there were added 310 grams (1 mole) of triphenyl phosphite and 5 grams of diphenyl phosphite (catalyst). This mixture was heated at a pot temperature which ranged between 144 and 155° C. over a period of about 2.5 hours while removing the phenol formed by vacuum distillation at 10–15 mm. In all 246 grams of phenol having a set point of 37° C. was removed. The product in the pot was filtered at 122° C. with the aid of filter-aid (Hi-Flo) to yield tris (neopentylene) tris (dipropylene glycol) tetraphosphite, refractive index 1.4920, Acid No. 0.012, specific gravity 1.128 at 25° C.

EXAMPLE 2

There were mixed together 2200 grams (9.75 moles) of phenyl neopentylene phosphite, 1306 grams (9.75 moles) of dipropylene glycol, 1008 grams (3.25 moles) of triphenyl phosphite and 10 grams of diphenyl phosphite (catalyst). This mixture was heated for about 10.5 hours at a pot temperature of 131–144° C. while removing the phenol formed by distillation at 10–15 mm. Some dipropylene glycol came over with the phenol and so there was added 470 grams more of dipropylene glycol as a replacement and heating was continued for another 6 hours at a pot temperature which ranged from about 141–154° C. In all there was removed 1760 grams of phenol (96% of theory). The product in the pot was filtered at 110° C. with filter-aid (Hi-Flo) to produce tris (neopentylene) tris (dipropylene glycol) tetraphosphite, refractive index 1.4706, Acid No. 0.063, specific gravity 1.102. The product had a purple cast.

EXAMPLE 3

1840 grams (8.14 moles) of phenyl neopentylene phosphite, 1090 grams (8.14 moles) of dipropylene glycol and 10 grams of diphenyl phosphite were heated at a pot temperature of 127–150° C. for about 8 hours while removing the phenol formed to produce dipropylene glycol (neopentylene) phosphite. There was added to the pot 390 grams of dipropylene glycol to replace that removed with the phenol (669 grams of phenol were recovered at 10–15 mm. by vacuum distillation).

To the pot were added 840 grams of triphenyl phosphite (2.71 moles) and 10 grams of diphenyl phosphite and the mixture heated at a pot temperature of 135–167° C. over about 6 hours while removing the phenol formed by vacuum distillation at 10–15 mm. There were recovered 795 grams of phenol having a set point of 39.4° C.

The product in the pot was filtered at 130° C. to recover this (neopentylene) tris (dipropylene glycol) tetraphosphite as a liquid having a purple cast, refractive index 1.4722, Acid No. 0.240, specific gravity 1.104.

EXAMPLE 4

5 moles of phenyl neopentylene phosphite, 5 moles of 4,4'-isopropylidene dicyclohexanol, 1⅓ moles of triphenyl phosphite and 5 grams of diphenyl phosphite were heated for about 10 hours at a temperature of 120–155° C. to produce tris (neopentylene) tris (4,4'-isopropylidene dicyclohexanol) tetraphosphite as the residue in the pot.

EXAMPLE 5

The procedure of Example 4 was repeated replacing the isopropylidene dicyclohexanol by 1⅓ moles of bisphenol A to produce as the product tris (neopentylene) tris (4,4'-isopropylidene diphenol) tetraphosphite as the residue in the pot.

EXAMPLE 6

1 part of the tris (neopentylene) tris (dipropylene glycol) tetraphosphite prepared in Example 2 was added to 100 parts of polyvinyl chloride to give a product which showed good stability in accelerated heat aging tests.

EXAMPLE 7

A stabilized polyvinyl chloride composition was prepared from the following materials

| | Parts |
|---|---|
| Polyvinyl chloride | 100 |
| Dioctyl phthalate | 60 |
| Tris (neopentylene) tris (dipropylene glycol) tetraphosphite | 1.5 |
| Epoxidized soya bean oil | 1 |
| Barium-cadmium laurate | 1 |

I claim:
1. A compound having a formula selected from the group consisting of

(a) 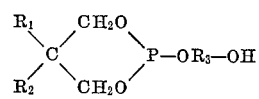

and (b) 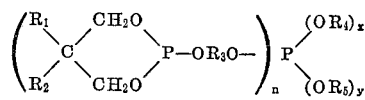

where $R_1$ and $R_2$ are lower alkyl, —$OR_3O$— is the divalent residue of a member of the group consisting of (1) dihydric alcohols having at least 4 carbon atoms separating the hydroxyl groups, any substituents on the dihydric alcohol other than hydrogen being ether oxygen, said dihydric alcohol having a molecular weight up to 2025, and (2) dihydric phenols having at least 4 carbon atoms separating the phenolic groups, said dihydric phenol having the formula

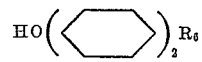

where $R_6$ is selected from the group consisting of lower alkylidene, S, SO, $SO_2$ and the chloro and bromo derivatives thereof wherein the chlorine or bromine is attached to the phenyl groups, when $R_6$ is alkylidene $R_4$ and $R_5$ are selected from the group consisting of 1 to 18 carbon atom alkyl, phenyl, methylphenyl and chlorophenyl, $n$ is an integer from 1 to 3, and $x+y$ equal $3-n$.

2. A compound according to claim 1 having the formula $$\begin{pmatrix} R_1 \\ \diagdown \\ R_2 \diagup \end{pmatrix} C \begin{pmatrix} CH_2O \\ \diagdown \\ \diagup \\ CH_2O \end{pmatrix} P-OR_3O-H$$

3. A compound according to claim 2 wherein

—OR₃O— is the residue of a polyalkylene glycol.

4. A compound according to claim 3 wherein

—OR₃O— is the residue of polypropylene glycol.

5. A compound according to claim 2 wherein $R_1$ and $R_2$ are methyl and —OR₃O— is the residue of a polyalkylene glycol.

6. Neopentylene (dipropylene glycol) phosphite.

7. A compound according to claim 2 wherein

—OR₃O— is the residue of 4,4'-isopropylidene dicyclohexanol.

8. Neopentylene (4,4'-isopropylidene dicyclohexanol) phosphite.

9. A compound according to claim 1 having the formula $$\left( \begin{array}{c} R_1 \\ \diagdown \\ R_2 \diagup \end{array} C \begin{array}{c} CH_2O \\ \diagdown \\ \diagup \\ CH_2O \end{array} P-OR_3O- \right)_m P \begin{array}{c} (OR_4)_x \\ \diagdown \\ (OR_5)_y \end{array}$$

where $m$ is an interger from 1 to 2 and $x+y$ equals $3-m$.

10. A compound according to claim 1 having the formula $$\left( \begin{array}{c} R_1 \\ \diagdown \\ R_2 \diagup \end{array} C \begin{array}{c} CH_2O \\ \diagdown \\ \diagup \\ CH_2O \end{array} P-OR_3O- \right)_3 P$$

11. A compound according to claim 10 wherein —OR₃O— is the residue of a polyalkylene glycol.

12. A compound according to claim 11 wherein —OR₃O— is the residue of polypropylene glycol.

13. A compound according to claim 10 wherein $R_1$ and $R_2$ are methyl and —OR₃O— is the residue of a polyalkylene glycol.

14. Tris (neopentylene) tris (dipropylene glycol) tetraphosphite.

15. A compound according to claim 10 wherein —OR₃O— is the residue of 4,4'-isopropylidene dicyclohexanol.

16. Tris (neopentylene) tris (4,4'-isopropylidene dicyclohexanol) tetraphosphite.

17. A compound according to claim 10 where

—OR₃O— is the residue of a bisphenol.

References Cited

UNITED STATES PATENTS 3,194,795    7/1965    Friedman.

CHARLES B. PARKER, *Primary Examiner.*

A. H. SUTTO, *Assistant Examiner.*

U.S. Cl. X.R.

260—937, 45.95, 982, 45.8, 814